(12) United States Patent
Buchwald et al.

(10) Patent No.: US 7,173,423 B2
(45) Date of Patent: Feb. 6, 2007

(54) SYSTEM AND METHODS FOR TESTING OPERATION OF A RADIO FREQUENCY DEVICE

(75) Inventors: Randall Henry Buchwald, Waukesha, WI (US); Ceylan Celil Guelu, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/124,330

(22) Filed: May 6, 2005

(65) Prior Publication Data

US 2006/0250135 A1    Nov. 9, 2006

(51) Int. Cl.
*G01V 3/00* (2006.01)
(52) U.S. Cl. ...................... 324/318; 324/322
(58) Field of Classification Search ............... 324/318, 324/322
See application file for complete search history.

(56) References Cited

U.S. PATENT DOCUMENTS

| 5,336,988 | A | * | 8/1994 | Chmielewski et al. ... 324/76.19 |
| 5,545,999 | A | | 8/1996 | Mueller et al. |
| 5,739,936 | A | | 4/1998 | Yakymyshyn et al. |
| 5,869,966 | A | * | 2/1999 | Gatehouse ................... 324/322 |
| 6,144,205 | A | * | 11/2000 | Souza et al. ................ 324/322 |
| 6,404,949 | B1 | * | 6/2002 | Sargent et al. ................ 385/24 |

* cited by examiner

*Primary Examiner*—Louis M. Arana
(74) *Attorney, Agent, or Firm*—The Small Patent Law Group LLP; Evan R. Sotiriou

(57) ABSTRACT

A system and a method for testing a Radio Frequency (RF) device are provided. The system includes a light emitting source configured to transmit an optical test signal based on an RF signal and a detector provided as a part of the RF device and configured to detect the transmitted optical test signal.

20 Claims, 3 Drawing Sheets

US 7,173,423 B2

SYSTEM AND METHODS FOR TESTING OPERATION OF A RADIO FREQUENCY DEVICE

BACKGROUND OF THE INVENTION

This invention relates generally to Radio Frequency (RF) devices, and more particularly, to methods and systems for testing RF devices.

RF devices are used to send or receive electromagnetic signals. Examples of RF devices include RF coils used in Magnetic Resonance Imaging (MRI) systems such as surface coils. The surface coil is an antenna that is designed to transmit and/or collect signal from a specific region of the body. A surface coil, typically, includes multiple coil elements.

Over the past few years, the number of coil elements inside a surface coil has been increasing, making the structure of circuit inside it complex. A typical surface coil includes 8 to 64 coil elements. The number of coil elements in the surface coil is expected to increase further in future.

The surface coils undergo lot of stress due to handling and usage. Moreover, a complex structure of the surface coils makes its components more prone to failure. The surface coils undergo a variety of tests and quality control checks regularly to ensure safety of both patients undergoing MR investigations and instrumentation used in MRI systems. However, it is difficult to test individual circuits, such as decoupling elements and preamplifiers, present inside the surface coils. Moreover, operating conditions of the surface coils are affected by the presence of a testing device including electrical wiring in its vicinity.

Known methods use phantoms, to test the surface coils. A phantom is an object of a known size and composition that can be imaged to test or monitor homogeneity, imaging performance and orientation aspects of MRI systems. However, the test is subject to process variations such as the proximity of the phantom to individual coil elements. Multiple phantoms may be needed, one for each surface coil. Moreover the phantom may be required to be re-positioned on the surface coil to test alternate coil elements and combinations. Therefore, the test of a particular coil is time consuming and cumbersome.

BRIEF DESCRIPTION OF THE INVENTION

In an exemplary embodiment of the invention, a system for testing a Radio Frequency (RF) device is provided. The system includes a light emitting source configured to transmit an optical test signal based on an RF signal and a detector provided as a part of the RF device and configured to detect the transmitted optical test signal.

In another exemplary embodiment of the invention, a method for testing Magnetic Resonance Imaging (MRI) surface coil is provided. The method includes generating an optical RF test signal and coupling the optical RF test signal to a coil element of the MRI surface coils using a fiber optic medium.

DETAILED DESCRIPTION OF THE INVENTION

Various embodiments of the invention provide a method and a system for testing a Radio Frequency (RF) device. Specifically, various embodiments of the invention provide a method and a system for testing various components of the RF device by sending test signal to each component without affecting an environment of the component.

The system includes a light emitting source and a detector. In an embodiment of the invention, the detector is provided as a part of the RF device. In various embodiments of the invention, the detector is connected to a specific component of the RF device that is to be tested. The method involves sending an RF modulated optical signal from a light emitting source to a detector through a fiber optic cable. The detector converts the optical signal into an electric signal and conveys it to an RF device component that needs to be tested.

Figure 1:
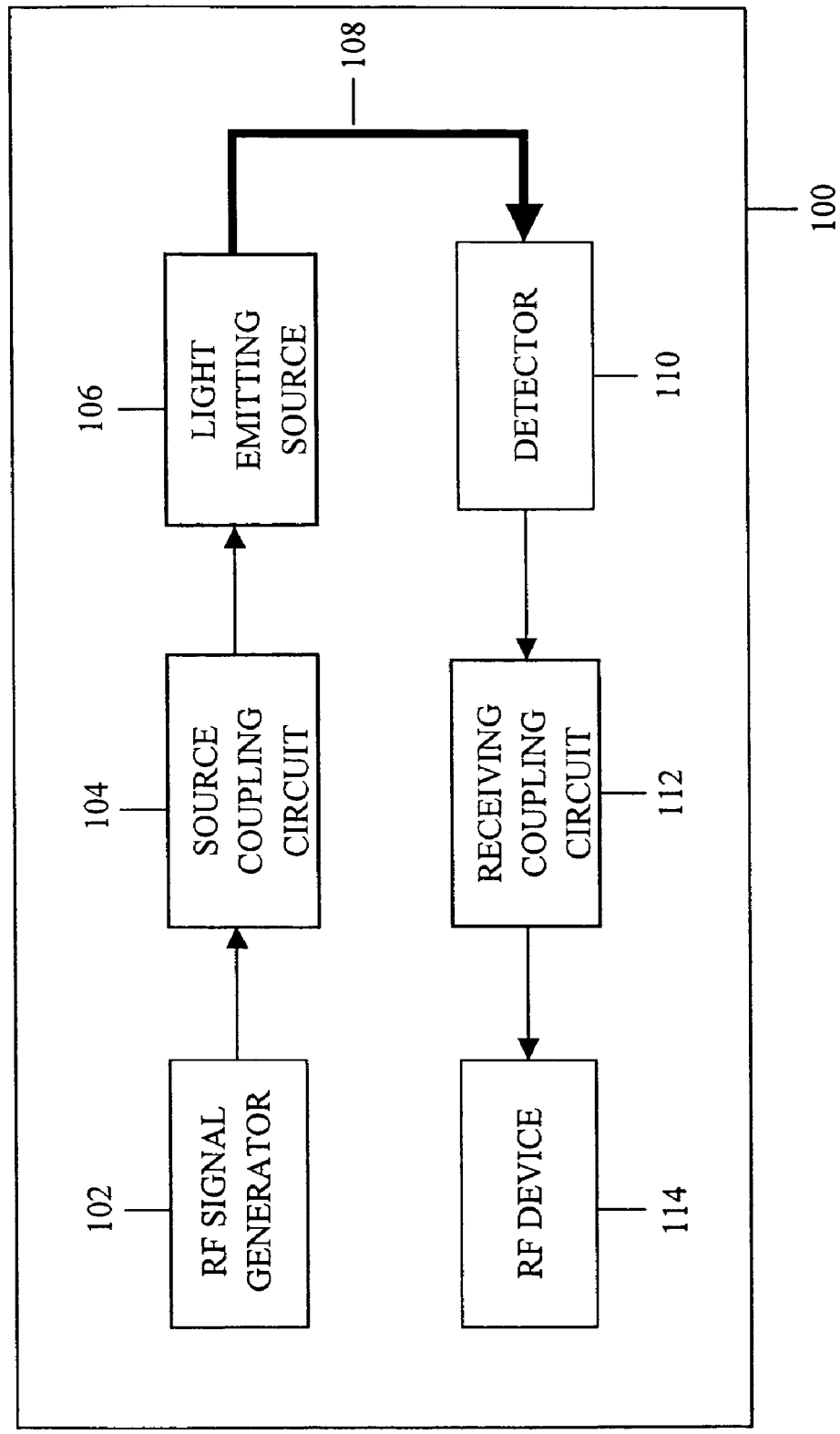
FIG. 1 is a block diagram illustrating a system for testing a Radio Frequency (RF) device, in accordance with an embodiment of the invention.

FIG. 1 is a block diagram illustrating a system 100 for testing an RF device 114, in accordance with an exemplary embodiment of the invention. System 100 includes an RF signal generator 102, a source coupling circuit 104, a light emitting source 106, a fiber optic cable 108, a detector 110, and a receiving coupling circuit 112.

RF device 114 is an RF field transducer or an antenna that needs to be tested. In an embodiment test input point of RF device 114 is difficult or hazardous to access or the connection of a test cable may affect the operation of RF device 114. Examples of RF device 114 include, but are not limited, to RF coils such as surface coils used in Magnetic Resonance Imaging (MRI) systems, a phased array antenna system, such as a radar, where the location or high power output of the radar makes the attachment of a metallic test cable difficult. Additional examples of RF device 114 include an electrically isolated RF data/telemetry receiver link that is a part of a high-voltage power distribution system, communications link antenna or preamplifier mounted on an exterior of an International Space Station, and an RF field strength probe commonly used to monitor fields in an RF test chamber, where a presence of a metallic signal conductor may interact with an RF field being measured by the probe.

Light emitting source 106 is configured to generate an RF modulated optical signal. Examples of light emitting source 106 include a Light Emitting Diode (LED) and a laser diode. In an embodiment of the invention, system 100 further includes a modulator configured to modulate the optical test signal generated by the laser diode. Examples of the modulator include a Mach-Zehnder modulator and an electro-optic crystal. In an embodiment of the invention, the electro-optic crystal includes Lithium Niobate ($LiNbO_3$). In various embodiments of the invention, light emitting source 106 is forward biased with a nominal operating current. Light emitting source 106 is coupled to RF signal generator 102 through source coupling circuit 104. RF signal generator 102 is a voltage source. In various embodiments of the invention, RF signal generator 102 generates an RF signal of 63.8 MHz or 127.72 MHz. In an alternative embodiment, RF signal generator 102 generates an RF signal ranging from 20 MHz to 130 MHz. In various embodiments of the invention, source coupling circuit 104 is configured to optimally couple the signal power to light emitting source 106. The RF signal generated by the RF signal generator 102 is an AC source and may benefit from a DC blocking element such as source coupling circuit 104. Therefore, source coupling circuit 104 allows only AC component of the RF signal to pass on to light emitting source 106. Source coupling circuit 104 may also serve the purpose of impedance matching between RF signal generator 102 and light emitting source 106. In an embodiment of the invention, source coupling circuit 104 is a capacitor. In an alternative embodiment of the invention, source coupling circuit 104 is a bandpass filter that has specific frequency response and impedance matching characteristics.

In an embodiment of the invention, a service tool is used as light emitting source 106. In an embodiment of the invention, the service tool is in a form of a small package including an RF oscillator block at a frequency of interest, a coupling network, a light emitting source and a power source such, as a battery, to power the oscillator, network, and the source. The service tool may be connected to RF device 114 as a signal source. In an embodiment of the invention, RF device 114 is a surface coil used in MRI systems and the response on the surface coil can be observed using the MRI scanner. In an embodiment of the invention, the oscillator block is configured to sweep across a band of frequencies and the response of the surface coil to the test inputs is observed on a display. In an embodiment of the invention, the service tool is integrated within RF device 114 interface that allows the test to be automated or run remotely using commands issued over a communications network coupled to system 100.

Light emitting source 106 is connected to detector 110 through fiber optic cable 108. In an embodiment of the invention, fiber optic cable 108 is routed throughout RF device 114. For example, fiber optic cable 108 may be intertwined in a coil element of an MRI surface coil. In various embodiments of the invention, an input of fiber optic cable 108 is an input of exterior of RF device 114. Light emitting source 106 generates the RF modulated optical signal from a signal output by source coupling circuit 104. The RF modulated optical signal is transmitted through fiber optic cable 108.

Detector 110 is configured to receive the transmitted RF modulated optical signal. Detector 110 is located at an output end of fiber optic cable 108. Detector 110 converts the transmitted RF modulated optical signal into an electric received RF signal. In an embodiment of the invention, detector 110 may be provided as a part of RF device 114. In an embodiment of the invention, detector 110 includes a photodiode. Examples of photodiodes include, but are not limited, to a Positive-Intrinsic-Negative (PIN) photodiode. In an embodiment of the invention, the PIN photodiode is discretely packaged. In an embodiment of the invention, the PIN photodiode is included in a photo-detector device such as a phototransistor where the PIN photodiode forms a base collector junction of the phototransistor. Detector 110 may include an amplification stage. In various embodiments of the invention, detector 110 may be operated in either a photovoltaic mode or a photoconductive mode. In an embodiment of the invention, detector 110 is operated in the photoconductive mode and system 100 further includes a DC voltage source. The voltage required by a photodiode depends upon its type. In an embodiment of the invention, the DC voltage source is a 9V battery.

The electric received RF signal recovered by detector 110 may include a DC component. The DC component of the electric received RF signal is filtered out by receiving coupling circuit 112. Therefore, receiving coupling circuit 112 allows only an AC component of the electric received RF signal to pass on to RF device 114 and generates a filtered receive signal. Receiving coupling circuit 112 may also serve a purpose of impedance matching between detector 110 and RF device 114. In an embodiment of the invention, receiving coupling circuit 112 is a capacitor. Receiving coupling circuit 112, thus, couples AC output of detector 110 to RF device 114. In an embodiment of the invention, detector 110 and receiving coupling circuit 112 are tuned to a Larmor frequency of nuclei placed in a magnetic field. In an embodiment of the invention, a processor operates detector 110 and receiving coupling circuit 112 to resonate at the Larmor frequency.

In an embodiment of the invention, detector 110 may be connected to a specific part of RF device 114 that needs to be tested through receiving coupling circuit 112. In an embodiment of the invention, detector 110 may be connected to a particular coil element of an MRI surface coil. RF device 114 processes the filtered receive signal to generate an RF device output signal. For example, RF device 114 amplifies the filtered receive signal. As another example, RF device 114 provides resistance to the filtered receive signal.

In an embodiment of the invention, system 100 further includes a frequency analyzer. The frequency analyzer is connected to RF device 114 and is configured to generate a frequency response of the output signal of RF device 114. In an embodiment of the invention, a human analyzes the frequency response displayed on the frequency analyzer to determine whether RF device 114 is functioning within a predetermined frequency range. Examples of the frequency analyzer include, but are not limited, to a spectrum analyzer with a tracking generator and a network analyzer operating in an S21 measurement mode. The tracking generator output connects as a source of RF signal. The frequency of the output of the tracking generator is coordinated with the receive frequency displayed on the tracking generator. The tracking generator provides controls to customize the displayed frequency range, measurement frequency, and other parameters.

Figure 2:
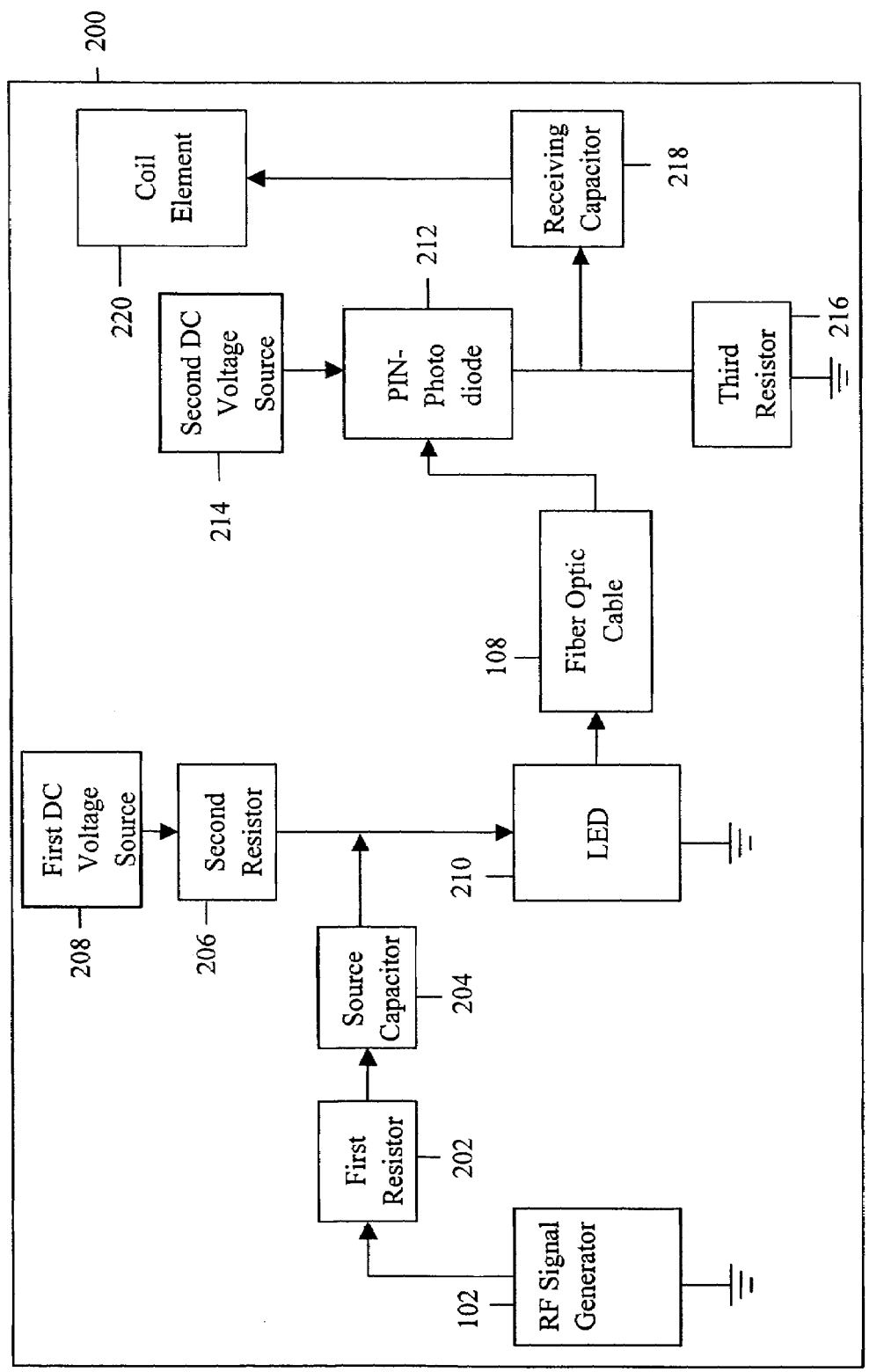
FIG. 2 is a block diagram illustrating a system for testing Magnetic Resonance Imaging (MRI) surface coil, in accordance with an exemplary embodiment of the invention.

FIG. 2 is a block diagram illustrating a system 200 for testing a coil element of an MRI surface coil, in accordance with an exemplary embodiment of the invention. System 200 includes RF signal generator 102, a first resistor 202, a source capacitor 204, a second resistor 206, a first DC voltage source 208, an LED 210, fiber optic cable 108, a PIN photodiode 212, a second DC voltage source 214, a third resistor 216, a receiving capacitor 218 and a coil element 220.

LED 210 is configured to generate the RF modulated optical signal. Intensity of light emitted by LED 210 is dependent upon drive current through LED 210. The drive current through LED 210 is controlled by first DC voltage source 208, which establishes an operating point current of the RF modulated optical signal generated by RF signal generator 102 and defines a range of current modulation. First DC voltage source 208 and second resistor 206 establish a static bias current level of LED 210. Values of DC voltage source 208 and second resistor 206 may vary depending upon a type of LED 210 used and a static bias current level of LED 210. Additional resistors may be added if an intensity of light generated by LED 210 is to be further controlled. In an embodiment of the invention, first DC voltage source 208 is a 9V battery and second resistor 206 is a 350 Ω resistor. Second resistor 206 establishes a non-modulated bias current of about 20 milliamperes.

LED 210 is coupled to RF signal generator 102 through first resistor 202 and source capacitor 204. RF signal generator 102 is a voltage source. Source capacitor 204 couples the AC component of the RF signal generated by RF signal generator 102 and blocks the static bias current of LED 210 from interacting with the signal generator. A summation of the AC current from the RF signal generated by RF signal generator 102 with the static bias current results in a variation in the intensity of the optical signal generated by LED 210. An optical signal generated by LED 210 is therefore, the RF modulated optical signal. In an embodiment of the invention, RF signal generator 102 generates an RF signal of 63.8 MHz or 127.72 MHz. First resistor 202 represents an internal resistance of RF signal generator 102. In an embodiment of the invention, first resistor 202 is a 50 Ω resistor.

The RF modulated optical signal generated by LED 210 is transmitted via fiber optic cable 108 to PIN photodiode 212. PIN photodiode 212 is reverse biased using second DC voltage source 214 and third resistor 216. A voltage used to reverse bias PIN photodiode 212 depends upon a type of PIN photodiode 212 used. In an embodiment of the invention, second DC voltage source 214 is a 9V battery. Optionally, PIN photodiode 212 is forward biased by coupling a ground voltage to the PIN photodiode instead of second DC voltage source 214. In an embodiment of the invention, reverse biased PIN photodiode 212 is assembled within an MRI surface coil array and is located inside an MRI surface coil.

PIN photodiode 212 is coupled to coil element 220 through receiving capacitor 218. Receiving capacitor 218 is a coupling circuit. PIN photodiode 212 recovers the electric received RF signal from the transmitted RF modulated optical signal. The electric received RF signal recovered by PIN photodiode 212 may include a DC component. Also, it is possible that the circuit to which the recovered signal is to be applied has a DC bias. The DC component of the electric received RF signal is filtered out by receiving capacitor 218. Receiving capacitor 218 also blocks load circuit DC bias if there is any. Therefore, receiving capacitor 218 allows the AC component of the electric received RF signal to pass on to coil element 220. Receiving capacitor 218, therefore, couples the AC component of the electric received RF signal with coil element 220. Receiving capacitor 218 may also serve a purpose of impedance matching between PIN photodiode 212 and coil element 220.

In an embodiment of the invention, system 200 further includes the frequency analyzer. The frequency analyzer is connected to coil element 220 and is configured to generate the frequency response of the RF device output signal output by coil element 220. In an embodiment of the invention, system 200 further includes a controller, such as the computer, that controls system 200 for testing MRI surface coils. The controller controls RF signal generator 102 to generate the RF signal and test coil element 220. For example, the controller periodically sends a signal to RF signal generator 102 to test coil element 220. Optionally, a human inputs a command to the controller to test coil element 220.

Figure 3:
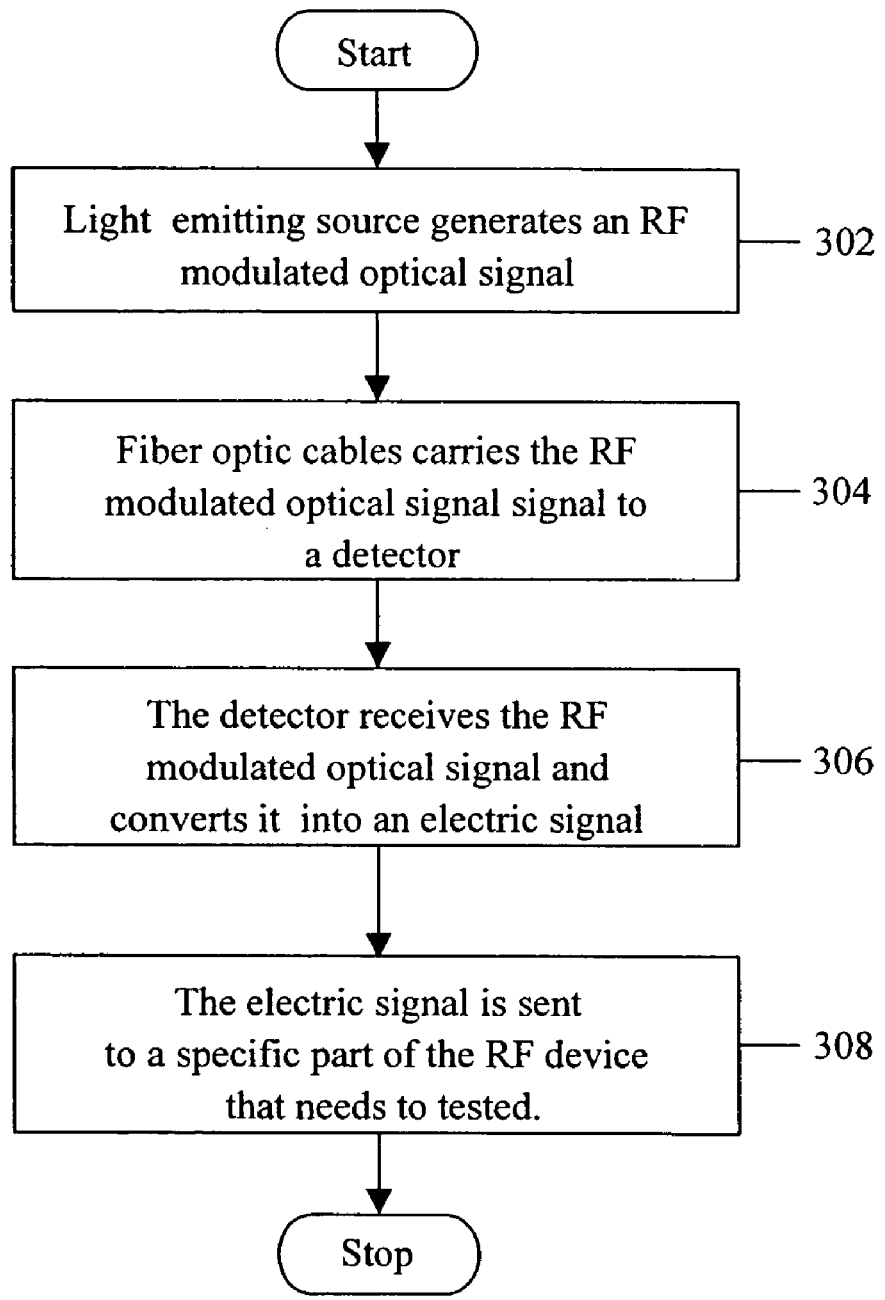
FIG. 3 is a flowchart of a method for testing an RF device, in accordance with an exemplary embodiment of the invention.

FIG. 3 is a flowchart of a method for testing an RF device, in accordance with an exemplary embodiment of the invention. At step 302, light emitting source 106 generates the RF modulated optical signal. In an embodiment of the invention, light emitting source 106 is forward biased and coupled to RF signal generator 102 through source coupling circuit 104. RF signal generator 102 is an AC voltage source and generates an AC signal corresponding to the frequency of the RF signal. The AC signal flows to light emitting source 106 through source coupling circuit 104. Light emitting source 106 generates an optical signal, intensity of which depends upon an amount of the AC signal. Therefore the optical signal generated by light emitting source 106 is the RF modulated optical signal.

At step 304, the RF modulated optical signal is transmitted via fiber optic cable 108 to detector 110. In an embodiment of the invention, detector 110 may be a part of RF device 114.

At step 306, detector 110 receives the transmitted RF modulated optical signal and converts it into the electric received RF signal. In various embodiments of the invention, detector 110 includes a photodiode. Examples of photodiode include, but are not limited, to PIN photodiode such as Industrial Fiber Optics, Inc. P/N IF-D91 and photodiode receivers (with lower bandwidth) such as the Agilent HFBR-2416. In various embodiments of the invention, the photodiode can be operated in either a photovoltaic or a photoconductive mode. In the photovoltaic mode, the photodiode directly converts optical energy to electrical energy and does not require any electrical bias, such as second DC voltage source 214, to operate. A response speed of the photodiode in this mode is limited, but is usable with frequency signals of a few kHz input to the photodiode. In an embodiment of the invention, the photodiode is operated in the photoconductive mode and connected to second DC voltage source 214. A voltage used by the photodiode depends upon a type. When the RF modulated optical signal is received by the photodiode, a leakage current is produced that passes through third resistor 216. The leakage current so produced is linearly proportional to an intensity of the RF modulated optical signal over a wide dynamic range, such as from 0–120 dB, of RF signal frequency and has a quicker response time than when the photodiode is operated in the photovoltaic mode. Bandwidths of hundreds of MHz are achievable when the photodiode is used in the photoconductive mode. At step 308, the electric received RF signal output from detector 110 is sent to a specific part of RF device 114 that is to be tested through receiving coupling circuit 112. RF device 114 then sends the RF device output signal to the frequency analyzer to analyze the RF device output signal.

Various embodiments of the invention allow testing of a specific point or component of RF device 114. Various embodiments of the invention allow the filtered receive signal to be transmitted directly to a specific point or component of RF device 114 without affecting an RF field environment of RF device 114.

Various embodiments of the invention use fiber optic cables that do not affect the RF field environment and can be placed close to RF device 114.

Various embodiments of the invention allow a frequency and an amplitude of the RF signal to be controlled without disturbing the RF field environment. This allows a sweeping of frequency of the RF signal over a wide range.

Various embodiments of the invention may have fiber optic cable 108 integrated within RF device 114 and RF device 114 is automatically tested from a remote location.

While the invention has been described in terms of various specific embodiments, those skilled in the art will recognize that the invention can be practiced with modification within the spirit and scope of the claims.

What is claimed is:

1. A system for testing a radio frequency (RF) device, said system comprising:
    a light emitting source configured to transmit an optical test signal based on an RF signal; and
    a detector provided as part of said RF device and configured to detect the transmitted optical test signal.

2. A system in accordance with claim 1, wherein said light emitting source comprises one of a light emitting diode configured to generate the optical test signal and a laser diode configured to generate the optical test signal, said system comprises a modulator configured to modulate the optical test signal generated by said laser diode, and said modulator comprises one of a Mach-Zehnder modulator and an electro-optic crystal, and said electro-optic crystal comprises LINbO3.

3. A system in accordance with claim 1, wherein said detector comprises a photodiode configured to receive the transmitted optical test signal.

4. A system in accordance with claim 1, wherein said detector comprises a photodiode configured to receive the transmitted optical test signal, and said photodiode operated in a photoconductive mode when the transmitted optical test signal is received by said photodiode.

5. A system in accordance with claim 1, wherein said detector comprises a photodiode configured to receive the transmitted optical test signal, said photodiode operated in a photoconductive mode when the transmitted optical test signal is received by said photodiode, and said system further comprising a direct current (DC) voltage source configured to operate said photodiode in the photoconductive mode.

6. A system in accordance with claim 1, wherein said detector comprises a photodiode configured to receive the transmitted optical test signal, said system further comprising a coupling circuit coupled to said RF device and said photodiode, and said coupling circuit configured to perform alternating current (AC) coupling on an output of said photodiode.

7. A system in accordance with claim 1, wherein said detector comprises a photodiode configured to receive the transmitted optical test signal, said system further comprising a coupling circuit coupled to said RF device and said photodiode, said coupling circuit configured to perform alternating current (AC) coupling on an output of said photodiode, and said photodiode and said coupling circuit are tuned to a Larmor frequency of nuclei placed in a magnetic field.

8. A system in accordance with claim 1 further comprising a frequency analyzer configured to receive a received test signal output from said RF device and configured to generate a frequency response of the received test signal, wherein said RF device comprises an RF surface coil element of a magnetic resonance imaging (MRI) system.

9. A system for testing magnetic resonance imaging (MRI) surface coils, said system comprising:
 a light emitting source configured to transmit an optical test signal based on a radio frequency (RF) signal; and
 a detector provided as part of the MRI surface coils and configured to detect the transmitted optical test signal; and
 a fiber optic cable connecting the light emitting source and the detector, the fiber optic cable intertwined in a coil element of the MRI surface coils.

10. A system in accordance with claim 9 further comprising a controller configured to control said system to test said MRI surface coils.

11. A system in accordance with claim 9, wherein said light emitting source comprises one of a light emitting diode configured to generate the optical test signal and a laser diode configured to generate the optical test signal.

12. A system in accordance with claim 9, wherein said detector comprises a photodiode configured to receive the transmitted optical test signal.

13. A system in accordance with claim 9, wherein said detector comprises a photodiode configured to receive the transmitted optical test signal, and said photodiode operated in a photoconductive mode when the transmitted optical test signal is received by said photodiode.

14. A system in accordance with claim 9, wherein said detector comprises a photodiode configured to receive the transmitted optical test signal, said photodiode operated in a photoconductive mode when the transmitted optical test signal is received by said photodiode, and said system further comprising a direct current (DC) voltage source configured to operate said photodiode in the photoconductive mode.

15. A system in accordance with claim 9, wherein said detector comprises a photodiode configured to receive the transmitted optical test signal, said system further comprising a coupling circuit coupled to a coil element of said MRI surface coils and coupled to said photodiode, and said coupling circuit configured to perform alternating current (AC) coupling on an output of said photodiode.

16. A system in accordance with claim 9, wherein said detector comprises a photodiode configured to receive the transmitted optical test signal, said system further comprising a coupling circuit coupled to a coil element of said MRI surface coils and coupled to said photodiode, said coupling circuit configured to perform alternating current (AC) coupling on an output of said photodiode, and said photodiode and said coupling circuit are tuned to a Larmor frequency of nuclei placed in a magnetic field.

17. A method for testing magnetic resonance imaging (MRI) surface coils, said method comprising:
 generating an optical radio frequency (RF) test signal; and
 coupling the optical RF lest signal to a coil element of the MRI surface coils using a fiber optic medium intertwined with the coil element.

18. A method in accordance with claim 17 further comprising testing the coil element by operating a voltage source at a plurality of frequencies.

19. A method in accordance with claim 17 further comprising:
 receiving the optical RF test signal; and
 reverse biasing a photodiode when the optical RF test signal is received.

20. A method in accordance with claim 17 further comprising:
 receiving the optical RF test signal; and
 applying a direct current (DC) voltage to a photodiode when the optical RF test signal is received.

* * * * *